United States Patent [19]

Willsey

[11] 3,752,340

[45] Aug. 14, 1973

[54] ARTICLE HANDLING APPARATUS
[75] Inventor: Charles H. Willsey, Topeka, Kans.
[73] Assignee: Seymour Foods, Inc., Topeka, Kans.
[22] Filed: Sept. 7, 1971
[21] Appl. No.: 177,931

[52] U.S. Cl................................ 214/314, 198/172
[51] Int. Cl............................................. B65b 21/02
[58] Field of Search................... 214/302, 312, 314; 198/30, 31, 197

[56] References Cited
UNITED STATES PATENTS

| 3,225,948 | 12/1965 | Mumma | 214/314 |
| 791,243 | 5/1905 | Carlson | 198/30 |
| 3,623,591 | 11/1971 | Koch | 198/30 |
| 3,298,499 | 1/1967 | Ellis et al. | 198/171 |
| 1,856,733 | 5/1932 | Shepherd | 198/19 |

Primary Examiner—Gerald M. Forlenza
Assistant Examiner—Lawrence J. Oresky
Attorney—Guy A. Greenawalt and James T. FitzGibbon

[57] ABSTRACT

An apparatus for loading egg processing or handling equipment which comprises a swingably mounted support frame on which loaded filler flats may be placed in upright position with an associated, swingably mounted conveyor which is operable to hold the eggs on the filler flats while they are inverted by rotation of the support frame for deposit of the eggs on the conveyor and for advancing the eggs to an accumulator table when in a generally horizontal position, the eggs being deposited on the conveyor by retraction of the support frame and removal of the inverted filler flats. The accumulator table serves as a reservoir from which the eggs are transferred in parallel lines or row formation.

16 Claims, 16 Drawing Figures

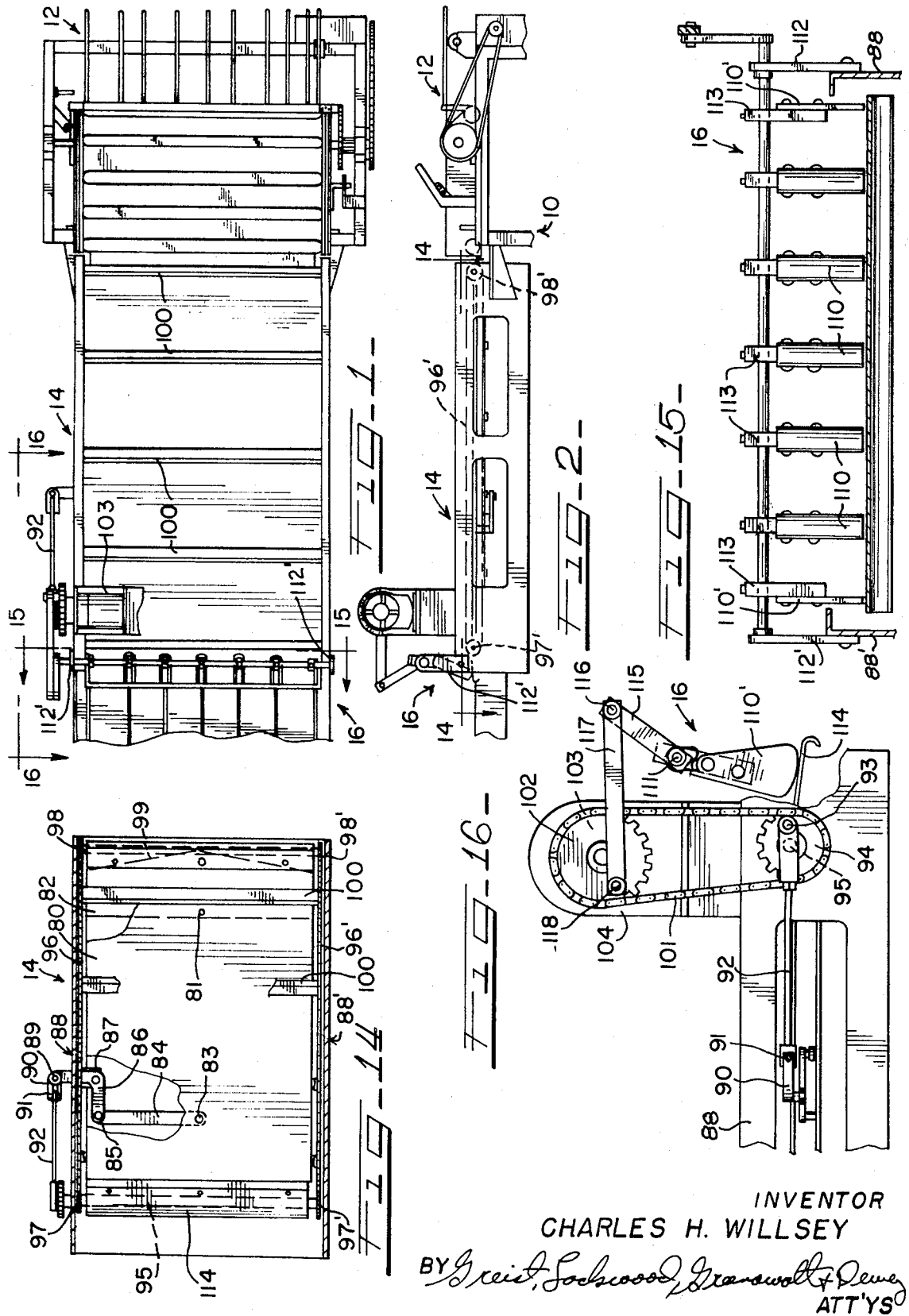

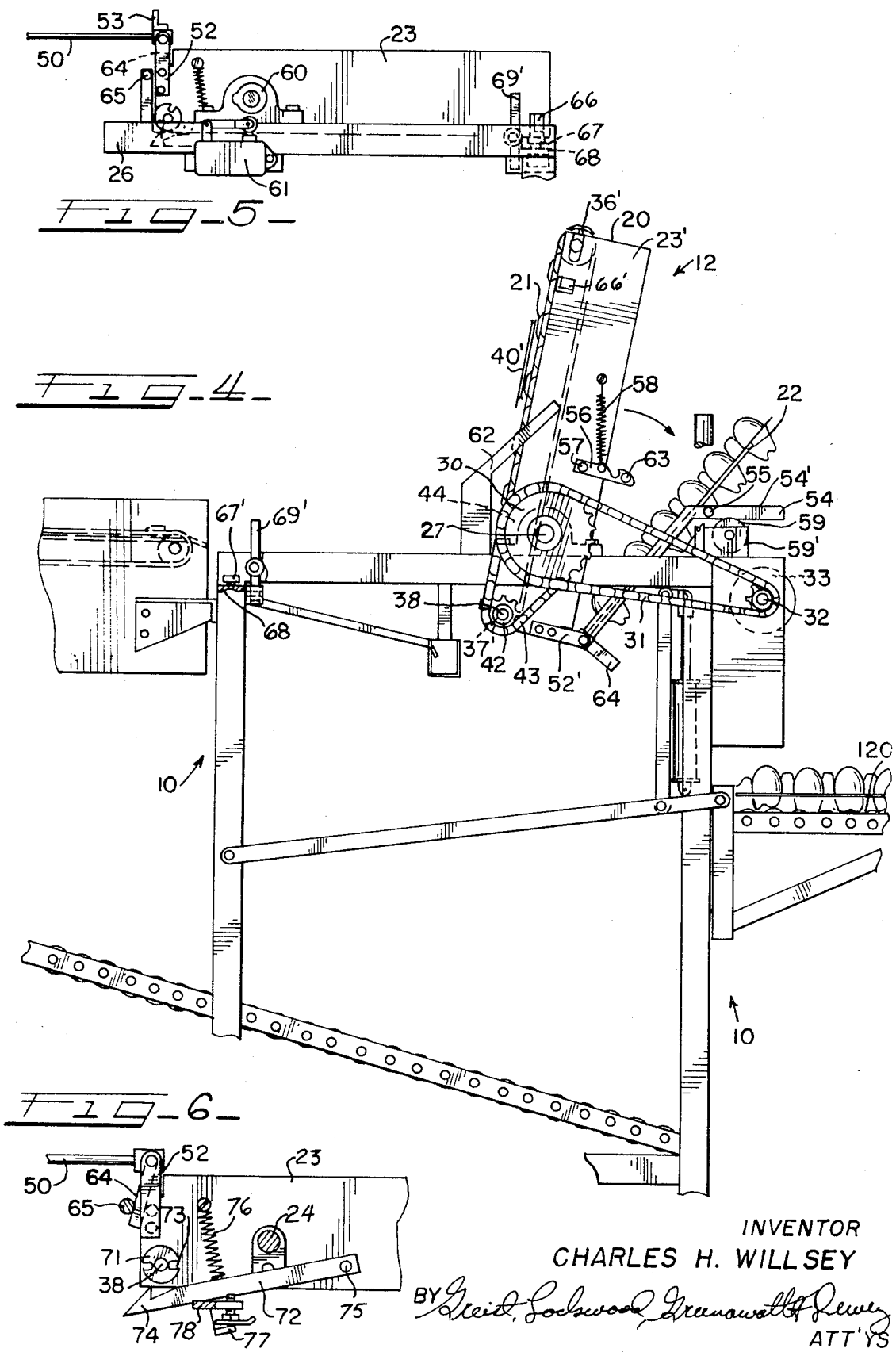

Patented Aug. 14, 1973
3,752,340
4 Sheets-Sheet 3
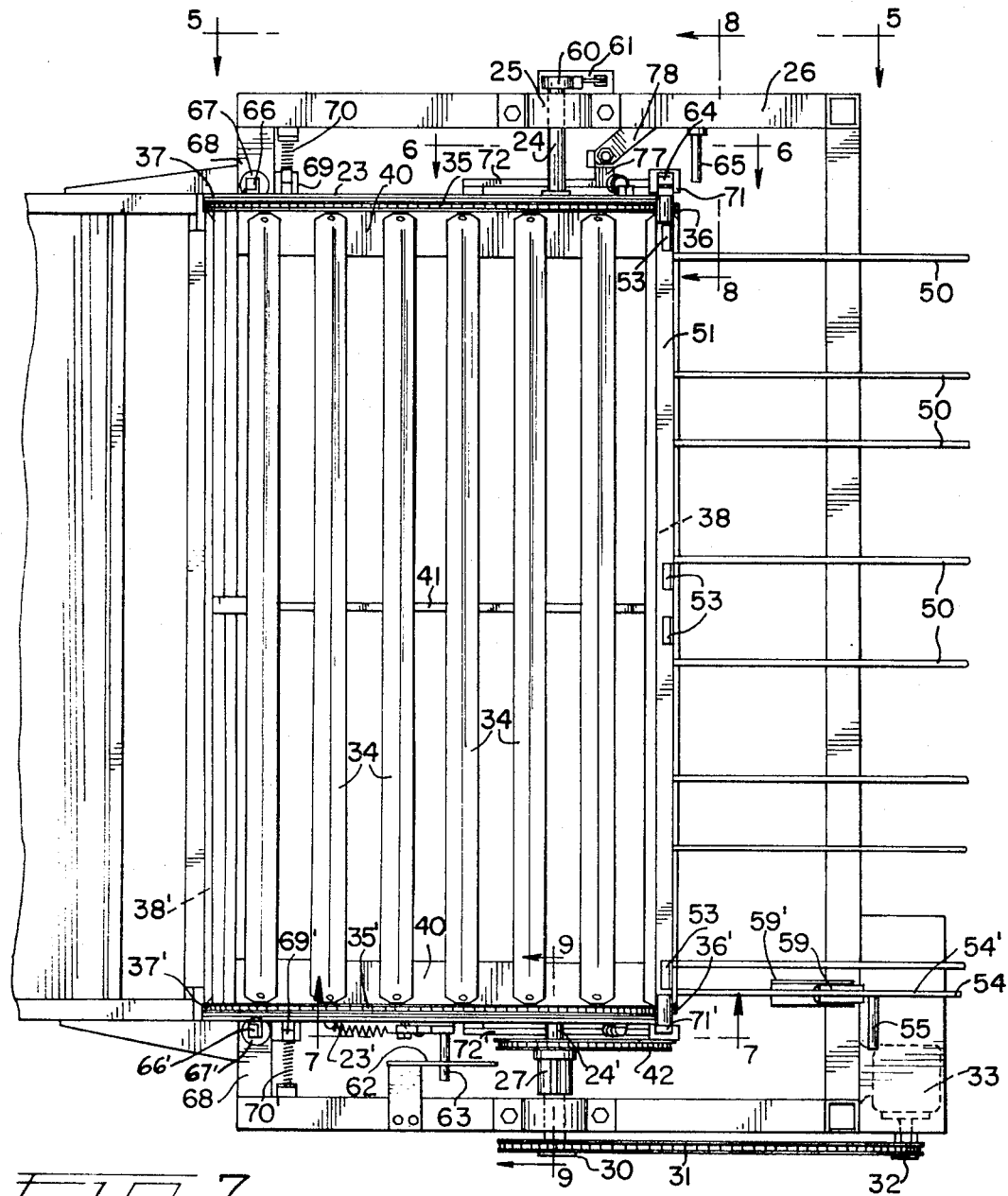
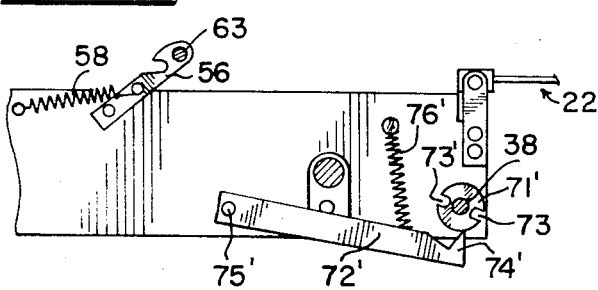
INVENTOR
CHARLES H. WILLSEY
BY Greist, Lockwood, Greenawalt & Dunn
ATT'YS

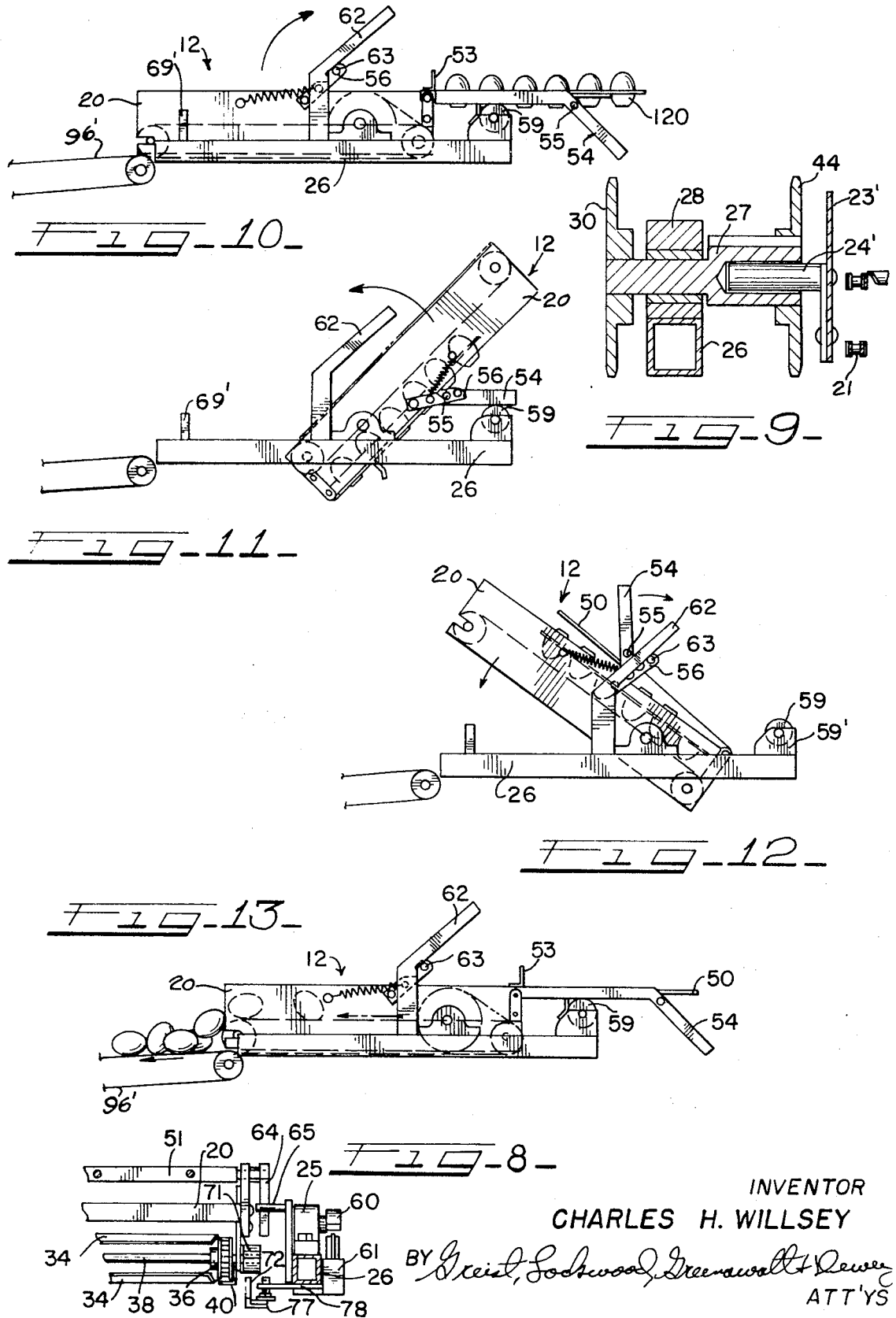

ARTICLE HANDLING APPARATUS

This invention relates to apparatus for the handling of eggs or the like and is more particularly concerned with improvements in apparatus for transferring eggs from filler flats to a reservoir or an accumulating area from which they may be advanced for loading, processing or other egg handling equipment such as egg washing machines, packing machines, or the like.

In the handling or processing of eggs, it is generally necessary to load the equipment with eggs supplied from filler flats which have been removed from the conventional bulk shipping crate in which the eggs are initially packed by the original supplier. Various arrangements have been suggested for use in unloading the filler flats and arranging the eggs for delivery to the processing or handling equipment. Generally, the eggs have been removed from the filler flats by lifter devices employing vacuum cups or mechanical gripping devices. This has involved a hand operation which it is desirable to eliminate. It is a general object, therefore, of the present invention to provide an apparatus for transferring eggs from filler flats to a reservoir from which the eggs are withdrawn in predetermined arrangement for loading processing or handling equipment, automatically.

A more specific object of the invention is to provide an apparatus for receiving filler flats filled with eggs in an upright position and for inverting the filler flats onto a traveling conveyor which is operative to advance the eggs to a reservoir-type apparatus from which they are withdrawn in a predetermined arrangement.

A still more specific object of the invention is to provide loading equipment for egg handling or processing apparatus which comprises a swingably mounted frame on which filler flats may be supported in upright position and held thereon by a swingably mounted conveyor mechanism while the assembly is rotated to a position where the filler flats are inverted and may be removed leaving the eggs on the conveyor which is operative to advance the eggs to an accumulator table with a discharge side having lane forming mechanism into which the eggs advance for delivery to other equipment in multiple line or lane arrangement.

Another object of the invention is to provide an egg handling apparatus which comprises a conveyor means for advancing eggs to a gathering or accumulating area where a supply of the eggs may be maintained while additional eggs are moved into the area and with provision for allowing the eggs to advance out of the area in a predetermined arrangement so as to serve as a feeder for maintaining a constant supply of eggs in processing or handling equipment, such as, a washer, grader, packer or the like.

A further object of the invention is to provide egg handling or transfer equipment which includes an apparatus for accumulating a supply of the eggs wherein the eggs are advanced by a traveling conveyor means along a table to an area where there is space for a substantial number of the eggs to be accumulated for delivery therefrom, in predetermined regular order, to other equipment, for example, into a series of lanes, with provision for imparting to the table on which the eggs are accumulating a relatively small laterally reciprocating or vibrating movement so as to agitate the accumulating eggs to a degree sufficient to insure that there is no jamming, blocking or piling up of the eggs which will impede their advance when they are otherwise free to move forward as a result of advancing movement of the eggs in the lanes ahead of them.

These and other objects and advantages of the invention will be apparent from a consideration of the egg handling apparatus which is shown by way of illustration in the accompanying drawings wherein:

FIG. 1 is a plan view showing an apparatus for handling eggs which incorporates therein the principal features of the invention;

FIG. 2 is a side elevation of the apparatus shown in FIG. 1;

FIG. 3 is an enlarged plan view of the receiving or entry end of the apparatus of FIG. 1;

FIG. 4 is a side elevation of the entry end of the apparatus;

FIG. 5 is a partial side elevational view taken on the line 5—5 of FIG. 3;

FIG. 6 is a fragmentary sectional view taken on the line 6—6 of FIG. 3, to an enlarged scale;

FIG. 7 is a fragmentary sectional view taken on the line 7—7 of FIG. 3, to an enlarged scale;

FIG. 8 is a fragmentary sectional view taken on the line 8—8 of FIG. 3;

FIG. 9 is a framentary section taken on the line 9—9 of FIG. 3, to an enlarged scale;

FIG. 10 is a partial side elevational view illustrating the initial loading position of the apparatus;

FIGS. 11 and 12 are side elevational views similar to FIG. 10 showing subsequent positions of the filler flat inverting assembly;

FIG. 13 is a partial side elevational view illustrating the final delivery or egg advancing position of the filler flat inverting and emptying assembly;

FIG. 14 is a sectional view, taken on the line 14—14 of FIG. 2 and with portions broken away, showing the mechanism for oscillating the accumulator table;

FIG. 15 is a cross sectional view taken on the line 15—15 of FIG. 1, to a larger scale and with portions broken away; and FIG. 16 is a partial side elevation on the line 16—16 of FIG. 1 and with portions broken away, showing the drive for the slat conveyor and the lane forming apparatus at the discharge end of the accumulator table.

Referring to FIGS. 1 and 2 of the drawings, there is illustrated an apparatus designed especially for handling shell eggs which incorporates the principal features of the invention and which is particularly adapted for use in loading egg processing or handling equipment such as egg washing machines, packers or the like. The illustrated apparatus comprises an elongate, upright, supporting frame 10 with mechanism 12 at the receiving end for inverting a loaded filler flat and transferring the eggs to an associated conveyor which advances them to a reservoir-forming table assembly 14 on which the eggs are accumulated and advanced to an aligning gate assembly 16 at the discharge end of the apparatus. The illustrated apparatus is particularly adapted as a feeder to be disposed at the entrance end of an egg washing machine, or the like, so as to enable a constant supply of eggs to be loaded onto the washing machine conveyor which carries them through the washing cycle. The filler flats may be deposited on the inverting mechanism 12 manually or by any suitable mechanical arrangement.

The filler flat inverting and emptying or unloading mechanism 12 at the entrance end of the apparatus comprises a pivotally supported rectangular frame 20 on which there is mounted a traveling conveyor 21 (FIGS. 3 and 4) and an associated supporting structure 22 for a filler flat with a complement of eggs thereon. The frame 20 has side plate members 23, 23' with connecting cross bars and is supported on the main support frame 10 by axially aligned pivot shaft members 24 and 24'. The one shaft member 24 which extends from frame side plate 23 is carried in bearing 25 which is mounted on the one side member of a top frame portion 26 of the main support frame 10 while the other pivot shaft member 24', which extends from the frame side plate 23', is carried in rotatable telescoped relation in the inner end of the drive shaft 27 (FIG. 9) which is mounted in bearing 28 on the opposite side member of the top frame portion 26. The drive shaft 27 carries a sprocket 30 on its outer end which is connected by the chain 31 with the sprocket 32 on a drive motor 33 which is supported on the vertical end face of the main frame 10 and which has a suitable switch (not shown) for manual control.

The conveyor 21 comprises a plurality of rather thin, cross bars 34 connected at their opposite ends to chains 35, 35' which are carried on pairs of sprockets 36, 37 and 36', 37' on shafts 38 and 38 . The chains 35 and 35' are supported along the run which is uppermost when the frame 20 is in the horizontal position as shown in FIGS. 3, 10 and 13, by bottom guide members 40, 40'. The guide members 40, 40' are secured to the side frame plates 23, 23' and the chain is held in a horizontal path while the cross bars 34 are supported at the middle of the frame 20 by a support or guide bar 41. The cross bars 34 are spaced along the chains sufficiently close to support the eggs as they are deposited thereon. The conveyor shaft 38 carries a sprocket 42 at one end which is connected by the chain 43 with a sprocket 44 on the drive shaft 27.

The filler flat supporting structure 22 is in the form of a frame having a series of rod members 50 (FIGS. 3 to 7) mounted in axially spaced relation on a cross bar 51 which is journaled at its opposite ends in bearing bracket members 52, 52', which bracket members are fixed on the ends of the conveyor side frame members 23 and 23'. The rods 50 are spaced so that in the horizontal position shown in FIG. 3 a pair of filler flats may be positioned thereon in side-by-side relation with the rods between egg receiving pockets, thus providing a support for the filler flats and also a locating means for properly positioning the filler flats for operation of the apparatus. Upstanding fingers or lugs 53 are provided on the cross bar 51 which serve to hold the filler flats against movement with the eggs when the eggs are resting on the slat conveyor 21 and the conveyor is operated to advance the eggs to the accumulator 14. When the conveyor frame 20 is moving to the position shown in FIG. 13 and the movement of the filler flat support frame 22 is reversed to bring it back to loading position, the lugs 53 will pick up pockets in the filler flats and prevent the latter from advancing with the eggs which are advanced by operation of the conveyor 21 when the conveyor frame has reached the FIG. 13 position. A bar member 54 having an angular end portion 54' is disposed at the one end of the support assembly 22 and provides a control arm member for movement of the assembly 22. The bar member 54 carries a latching pin 55 for co-operation with a latching arm 56 pivoted at 57 on the one side member 23' of the conveyor frame 20. A tension spring 58 urges the latching arm 56 in a counterclockwise direction as viewed in FIG. 4. A roller 59 is mounted by bracket 59' on a top cross bar of frame portion 26 and forms a support for engagement by the control arm or bar member 54 when the assembly 22 is in a horizontal position as shown in FIGS. 10 and 13 and also in the tilted position of FIG. 4 where the support 22 is in a plane approximately 45° relative to the horizontal. In this latter position, as shown in FIG. 4, the conveyor frame 20 is pivoting about the pivot shafts 24, 24' in a direction to engage or close upon the filler flat support frame 22. The pivotal movement of conveyor frame 20 draws the connected end or side of the filler flat support frame 22 downwardly and the control bar 54 rides on roller 59 resulting in tilting of the filler flat support frame 22 toward the conveyor frame 20. The control bar end portion 54' holds the frame 22 in tilted position until the latch plate or finger 56 engages the pin 55 and locks the two frames 20 and 22 together for reverse movement in a counterclockwise direction about the pivot shafts 24, 24'. A cam 60 (FIG. 5) on the end of pivot shaft 24 operates a microswitch 61 at this point to reverse the drive motor 33 and the conveyor frame 20 swings counterclockwise as viewed in FIG. 4. A cam arm 62 extends upwardly from frame portion 26 for engaging a pin 63 on the latch arm 56 to release the filler flat support frame 22 when the assembly reaches a predetermined position past the vertical so as to enable the filler flat support frame 22 to return to a horizontal open position as the conveyor frame continues to rotate counterclockwise to a horizontal position, leaving the eggs and the filler flat on the topmost run of the conveyor 21, with the filler flat held by lugs 53 against advance with the eggs, and enabling the filler flat to be picked off by the operator while the eggs are freed for advance by conveyor 21 to the reservoir or accumulator table assembly 14. The filler flat support frame 22 has an opening lever 64 (FIGS. 3 and 8) fixed on and extending radially at the one end of the pivot shaft member 51 and a co-operating cam member 65 is mounted on the top frame portion 26. The lever 64 engages the cam 65 when the assembly reaches a position just beyond the vertical (FIG. 12) and continued movement of the assembly causes the frame 22 to swing clockwise to the horizontal, filler flat receiving position of FIG. 13. The conveyor frame members 23, 23' carry stop brackets 66, 66' (FIGS. 3, 4 and 5) which engage with cushion stop members 67, 67' on the forward frame cross bar 68 when the frame 20 swings to the position of FIG. 12. The frame cross bar member 68 also carries a pair of friction brake members 69, 69' adjacent the stop members 67, 67' which are spaced apart so that when the conveyor frame 20 swings to the position of FIG. 13, the frame plates 23, 23' engage the inner vertical edges of the plate-like brake members 69, 69', which are pivoted on cross frame member 68 and backed by rubber compression spools 70, 70' so that there is sufficient frictional resistance to the movement to slow down the conveyor frame 20 at the end of the movement and bring it to rest without bouncing. The conveyor 21 is driven when the frame 20 is in the horizontal position shown in FIG. 13 for advancing the eggs to the reservoir table assembly 14. Rotation or pivotal movement of the frame 20 and driving of the conveyor 21 is accomplished by a common drive mechanism by holding the conveyor drive shaft 38 against rotation in the frame 20 while the frame is in motion.

The driven shaft 38 for the conveyor 21 has keyed on its opposite ends small rollers 71, 71' (FIGS. 3, 6, 7 and 8) and the conveyor side frame plates 23, 23 have mounted thereon latch arms 72, 72' for co-operation with the rollers 71, 71' to hold the shaft 38 against rotation relative to the frame 20. The latch arm and roller arrangement at each end of the frame 20 have substantially the same construction and operation and the arrangement at one end only will be described in detail, corresponding elements of the arrangement at the other end being indicated by the same numerals primed. The roller 71 (FIGS. 6 and 8) has in its periphery circumferentially spaced, axially extending slots 73 in which the hook formation 74 on the end of the latch arm 72 may engage to stop rotation of the shaft 38. The latch arm 72 is pivoted on the frame plate 23 at 75 and urged in a clockwise direction as viewed in FIG. 6 by tension spring 76 which is connected at one end to the latch arm 72 and at the other end to the frame side plate 23. The latch arm 72 has a finger 77 extending laterally outwardly of the frame plate 23 so as to travel in a path for engagement with a release cam 78 extending inwardly from the top side member of the frame 26 when the frame 20 is swung about pivots 24, 24' to the position shown in FIG. 12. The latch arms 72, 72' engage in the slots 73, 73' and hold the rollers 71, 71' so as to prevent operation of the conveyor 21 with the result that the pull on the forward end of the frame 20 exerted by the chain 43 and rotation of the drive shaft 27 will turn the frame 20 on the pivot members 24, 24'. The latch arms 72, 72' are engaged in holding relation with the rollers 71, 71' in all positions of the frame 20, except the positions of FIGS. 10 and 13, due to the action of the springs 76, 76' on the latch arms 72, 72' and the direction of rotation of the drive shaft 27. When the frame 20 reaches the position of FIG. 10 the arm 72 is disengaged from the roller 71 by the release cam 78 which permits the conveyor 21 to be driven by the motor 33, the latch arm 72' being ineffective when the direction of rotation of the shaft 38 is counterclockwise as viewed in FIG. 7.

The reservoir or accumulator apparatus 14 (FIGS. 1, 2, 14, 15 and 16) comprises a support plate 80 which is pivoted at 81 on a cross piece 82 on the main frame 10 and which is disposed in a horizontal plane. At its other end the support plate 80 is pivotally connected at 83 to a laterally extending link 84. The link 84 is pivoted at 85 to one arm of a bell crank 86, the latter being pivoted at 87 to the frame side piece 88. The other arm of the bell crank 86 is pivotally connected at 89 to a yoke 90 which in turn is pivotally connected at 91 to the end of en elongate pitman rod 92. The pitman rod 92 has an eccentric connection at 93 with a sprocket 94 on a driven cross shaft 95 which is journaled in the side frame members 88 and 88. The shaft 95 supports a pair of laterally spaced chains 96 and 96' by means of sprockets 97 and 97'. The chains 96 and 96' are supported at the other end of the support plate 80 by sprockets 98, 98 mounted on a cross shaft 99 journaled in the side frame members 88 and 88. A series of cross slats 100 are carried on the chains 96 and 96' with the top run thereof advancing over the top surface of the table forming plate member 80 so as to advance the eggs along the table surface to the discharge end of the reservoir apparatus 14. The sprocket 94 on the shaft 95 is connected by chain 101 with a power output sprocket 102 on drive motor 103 which is supported on a top cross frame 104. The laterally reciprocating movement of the table forming plate 80 is of relatively small amplitude but sufficient to agitate the eggs as they are moved to the discharge end of the apparatus by the slats 100. The cross slats 100 are relatively thin and when the eggs form an accumulation at the discharge end, the slats 100 will pass beneath the same without damage to the eggs.

The lane forming apparatus 16 (FIGS. 15 and 16) at the discharge end of the reservoir 14 comprises a series of laterally spaced members 110 which are disposed in vertically and longitudinally extending planes and in depending relation from a cross rod 111, the latter being journaled in the upper ends of bracket members 112, 112' which are mounted on the accumulator side frame members 88, 88. Each of the intermediate members 110 is formed by a relatively thin plate, preferably of plastic, which is bent to a generally U shape in horizontal cross section with the leg portions of generally triangular shape in elevation so as to present a rounded, relatively wide, generally vertical edge face in the direction of the oncoming eggs and extending in a generally vertical plane. The end members 110' are in the form of a single plate member of similar shape. Each of the lane members 110, 110' is mounted on the support rod 111 by means of a mounting block 113 with the bottom edge of each free to swing clear of a pad member 114 at the end of the accumulator floor. An arm 115 extends at the end of rod 111 and is pivotally connected at 116 to a pitman rod 117 which has an eccentric connection at 118 with the drive sprocket 102 so as to oscillate the cross rod 111. The oscillating movement is relatively small and provides a means for insuring that the eggs will pass between the plates and into the desired lanes without jamming.

In the use of the illustrated apparatus, and using FIG. 3 as a reference, with the slat conveyor 21 being driven by motor 33 so that the slats 34 are running in the direction of the accumulator 14 and the latch member 72 is held away from the cam roller 71 by release cam 78 (FIG. 6) filler flats loaded with eggs may be picked up from a supporting shelf or supply conveyor, indicated at 120 in FIG. 4, and placed in proper position on the rod members 50 of support frame 22. When the filler flats are in place on the rod members 50 the operator strikes a switch lever which reverses the direction of rotation of the motor. The latch arm 72' which is held against roller 71' by spring 76' engages in the co-operating slot 73' in the roller 71' so as to hold the shaft 38 against rotation which stops conveyor 21 and starts clockwise rotation of the frame 20 about the pivots 24, 24', as viewed in FIG. 4, until the conveyor frame 20 closes on the filler flat support frame 22, as illustrated in FIG. 11, whereupon the two frames are latched together by engagement of latch arm 56 with pin 55 on the control arm 54. The switch 61 is actuated by the cam 60 which reverses the rotation of the motor 33 and the load on latch 72' is transferred to latch 72. The two frames 20 and 22 are rotated in a counterclockwise direction as indicated by the arrow in FIG. 11, the shaft 38 being held against rotation by the engagement of the end of the dog forming member 72 (FIG. 6) in the co-operating slot 73 in the roller 71. When the assembly reaches the position shown in FIG. 12 the frame 22 is released by the cam arm 62 engaging the pin 63 on the latch arm 56. The cam member 65 engages the radial finger 64 on the shaft 51 and the support frame 22 is guided back to the horizontal position while the frame 20 continues to the horizontal position, as shown in FIG. 13, where the latch member 72 and roller 71 are disengaged by the member 78, permitting the conveyor 21 to be driven in the direction to advance the eggs which are resting on the slats 34 to the accumulator table 80. The slats 100 advance the eggs to the lane forming members 110, 110' where they may form an accumulation, insuring that the lanes remain full. The slats 100 are, of course, advanced beneath any eggs which accumulate at the entrance to the lane forming members 110, 110' when the lanes are filled to overflowing. The vibrating or lateral oscillating motion of the plate 80 is of relatively small amplitude so as to agitate the eggs and keep them advancing into the lanes formed by the members 110, 110'. The relatively small oscillating or swinging movement of lane members 110, 110' on the support shaft 111 insures that the eggs will not be hung up on the edges of members 110, 110' or form a jam at any of the lane entrances.

I claim:

1. An apparatus for transferring articles, such as eggs, from filler flats and advancing them, into lanes for feeding to processing or other handling equipment, said apparatus comprising means forming a swingably mounted frame, a traveling conveyor carried in said frame, means pivoted on said conveyor frame for supporting filler flats having eggs therein, means to pivot said flat supporting means relative to said conveyor frame and to swing said conveyor frame to a position to deposit the eggs onto said traveling conveyor by gravity, an accumulator apparatus, means for operating the traveling conveyor to advance the eggs to said accumulator apparatus, said accumulator apparatus including a table forming member disposed in a generally horizontal position with an area sufficient for supporting a plurality of the eggs which may accumulate thereon and having means for advancing the eggs along said table to said accumulating area, which egg advancing means is constructed to brush by the eggs and allow the eggs to accumulate in said area when their advance is obstructed, said accumulator apparatus including means for subjecting the eggs to lateral forces relative to the path of advance thereof so as to agitate the same, and means at the forward end of said table forming member for guiding the eggs into lane forming relation.

2. An apparatus as set forth in claim 1 wherein said means for guiding the eggs into lane forming relation comprises lane forming guide members, a plurality of divider members mounted in depending relation on a cross shaft which is journaled above the forward end of said table forming member and at the entrance to said lane forming guide members, and means to oscillate said shaft about its axis so as to engage the divider member with the eggs and prevent jamming at said entrance.

3. An apparatus as set forth in claim 1 wherein said means for guiding the eggs into lane forming relation comprises means forming a plurality of guide lanes, a plurality of vertically disposed plate members which are spaced laterally of the path of advance of the eggs at the entrance to said guide lane forming means, a cross bar on which said plate members are supported in depending relation, and means for turning said bar so as to oscillate said plate members and guide the eggs into the entrance ends of the guide lanes.

4. An apparatus as set forth in claim 3 wherein certain of said plate members are bent into U-shape and supported on said cross bar so that the curved portions thereof will engage the eggs as the eggs advance to said plate members and prevent jamming.

5. An apparatus as set forth in claim 1 wherein said means for supporting said filler flats and said conveyor comprises a filler support frame pivoted on said conveyor frame and wherein said filler support frame closes on a filler flat having eggs therein and means for thereafter inverting said hingedly so frames oo as to deposit the eggs on said traveling conveyor.

6. An apparatus as set forth in claim 1 wherein said means for supporting said filler flats and said conveyor comprises support frames pivotally connected along adjacent sides and movable to clamp between said frames a filler flat having eggs therein, means to swing the frames on a common axis so as to invert the frames and to deposit the eggs onto said traveling conveyor and means to separate the frames so as to free the eggs for advance on the conveyor by removal of the filler flat.

7. An apparatus for transferring articles, such as eggs, from filler flats and advancing them, into lanes for feeding to processing or other handling equipment, said apparatus comprising a traveling conveyor, means for supporting and inverting filler flats having eggs therein and thereby depositing the eggs onto said traveling conveyor, which means for supporting and inverting the filler flats comprises a pair of support frames hingedly connected along adjacent sides and movable to clamp between said frames a filler flat having eggs therein, means to swing the frames so as to invert the frames and to deposit the eggs onto said traveling conveyor and means to separate the frames so as to free the eggs for advance on the conveyor by removal of the filler flat, said traveling conveyor being mounted in one of said support frames and said support frames being mounted for swinging movement on a common axis while they are moved to clamp a filler flat between the same, means for operating the traveling conveyor to advance eggs thereon to an accumulator apparatus, said accumulator apparatus including a table forming member disposed in a generally horizontal position with an area sufficient for supporting a plurality of the eggs which may accumulate thereon, said accumulator apparatus having means for advancing the eggs along said table to said accumulating area which will allow the eggs to accumulate when their advance is obstructed, means for subjecting the eggs to lateral forces relative to the path of advance thereof so as to agitate the same, and means at the forward end of said table forming member for guiding the eggs into lane forming relation.

8. An apparatus as set forth in claim 7 wherein there is a common drive means for operating said traveling conveyor and for imparting a swinging movement to said support frames.

9. An apparatus for transferring eggs from filler flats or similar tray-like containers to other handling equipment which comprises an upright main frame, a rectangular sub-frame in which there is mounted a traveling conveyor, means mounting said conveyor frame on said main frame for swinging movement between a position where the top run of the conveyor is generally horizontal and a position where said top run is in a plane inclined upwardly relative to the horizontal, a support frame for a loaded filler flat which is pivotally connected to said conveyor frame, means for guiding said filler flat support frame between a generally horizontal position extended from said conveyor frame when said conveyor frame is in a generally horizontal position and a position which is generally parallel with and underlies the top run of said conveyor when said conveyor frame is in said inclined plane, means for holding said frames in parallel relation while said conveyor frame is swung in a partial return movement to a position inclined relative to the horizontal where said filler flat support frame is in overlying relation relative to said conveyor top run so as to invert the filler flat and enable deposit of the eggs on said conveyor top run, and means to guide said filler flat frame so as to return it to horizontal position while said conveyor frame completes the return movement to horizontal position.

10. An apparatus as set forth in claim 9 wherein said conveyor frame is mounted on said main frame to pivot on a transverse axis and said conveyor is mounted in said conveyor frame to travel on sprockets mounted on shafts journaled in said conveyor frame which are parallel with the pivot axis of said conveyor frame.

11. An apparatus as set forth in claim 9 wherein said conveyor frame is mounted on said main frame for movement on a transverse pivot axis and power drive means is connected to said conveyor frame to swing said conveyor frame on its pivot axis between a generally horizontal position and an upwardly inclined position where the connected filler flat support frame underlies said conveyor frame.

12. An apparatus as set forth in claim 9 wherein said conveyor frame is mounted on a pair of pivot members transversely aligned relative to said main frame which pivot members are journaled in said main frame, and power means connected with one of said pivot members for swinging said conveyor frame.

13. An apparatus as set forth in claim 9 wherein said traveling conveyor is mounted in said conveyor frame on spaced cross shafts which extend transversely of the main frame and said conveyor frame is mounted on said main frame by pivot members which are transversely aligned and parallel with the cross shafts for said traveling conveyor.

14. An apparatus as set forth in claim 13 wherein power means is connected to one of said pivot member members and to one of said conveyor shafts to selectively swing said conveyor frame and drive said traveling conveyor.

15. An apparatus as set forth in claim 9 wherein said filler flat support frame and said conveyor frame have interengaging cooperating latch members for holding said frames in parallel relation.

16. An apparatus as set forth in claim 15 wherein means is provided on said main frame for disengaging said latch members when said frames reach a predetermined point on the return movement of said conveyor frame to an initial horizontal position.

* * * * *

UNITED STATES PATENT OFFICE
CERTIFICATE OF CORRECTION

Patent No. 3,752,340    Dated August 14, 1973

Inventor(s) CHARLES H. WILLSEY

It is certified that error appears in the above-identified patent and that said Letters Patent are hereby corrected as shown below:

Column 3, line 24, the second occurrence of "38" should be -- 38' --

Column 5, line 56, the second occurrence of "88" should be -- 88' --

Column 6, line 16, the second occurrence of "88" should be -- 88' --

Column 8, line 11, after "hingedly" cancel "so" and insert -- connected --; same line, cancel "oo" and insert -- so --

Column 10, line 16, "member" should be canceled.

Signed and sealed this 5th day of March 1974.

(SEAL)
Attest:

EDWARD M. FLETCHER, JR.        C. MARSHALL DANN
Attesting Officer              Commissioner of Patents